(12) United States Patent
Takahashi et al.

(10) Patent No.: US 8,687,735 B2
(45) Date of Patent: Apr. 1, 2014

(54) WIRELESS COMMUNICATION SYSTEM, TRANSMITTER AND RECEIVER

(75) Inventors: Hiroki Takahashi, Osaka (JP); Yasuhiro Hamaguchi, Osaka (JP); Kazunari Yokomakura, Osaka (JP); Osamu Nakamura, Osaka (JP); Jungo Goto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 329 days.

(21) Appl. No.: 13/003,592

(22) PCT Filed: Aug. 5, 2009

(86) PCT No.: PCT/JP2009/063842
§ 371 (c)(1),
(2), (4) Date: Jan. 11, 2011

(87) PCT Pub. No.: WO2010/016507
PCT Pub. Date: Feb. 11, 2010

(65) Prior Publication Data
US 2011/0116566 A1    May 19, 2011

(30) Foreign Application Priority Data

Aug. 8, 2008  (JP) ................... 2008-205397
Apr. 27, 2009  (JP) ................... 2009-107223

(51) Int. Cl.
*H04L 27/00*    (2006.01)
(52) U.S. Cl.
USPC .......................................... 375/299; 375/295
(58) Field of Classification Search
USPC ..................................................... 375/267
See application file for complete search history.

(56) References Cited

U.S. PATENT DOCUMENTS

| | | | | |
|---|---|---|---|---|
| 7,986,741 B2* | 7/2011 | Tsai et al. | ...... | 375/261 |
| 8,098,745 B2* | 1/2012 | Bertrand et al. | ...... | 375/260 |
| 8,130,819 B2* | 3/2012 | Kim et al. | ...... | 375/220 |
| 8,169,994 B2* | 5/2012 | Ma et al. | ...... | 370/344 |
| 2006/0013186 A1* | 1/2006 | Agrawal et al. | ...... | 370/344 |

(Continued)

FOREIGN PATENT DOCUMENTS

CN   101002448 A   7/2007
JP   2007-221746 A   8/2007

(Continued)

OTHER PUBLICATIONS

Japanese Office Action for corresponding JP Application No. 2010-523870 issued Jan. 8, 2013.

(Continued)

*Primary Examiner* — Chieh M Fsn
*Assistant Examiner* — Santiago Garcia
(74) *Attorney, Agent, or Firm* — Birch, Stewart, Kolasch & Birch, LLP (57) ABSTRACT

According to the present invention, a transmitter includes: multiple antennas 15-1, 15-2; a DFT unit 04 configured to transform a time domain signal into a frequency domain signal; a cluster mapping unit 05 configured to divide the frequency domain signal into clusters and to assign the clusters to frequencies on the basis of cluster assignment information; an IDFT unit 06 configured to transform a mapped frequency domain signal into a time domain signal; and cyclic delay setting units 11-1, 11-2 configured to set, for the respective multiple antennas, a cyclic delay amount to the IDFT-transformed time domain signal.

8 Claims, 7 Drawing Sheets

(56) References Cited

U.S. PATENT DOCUMENTS

| | | | |
|---|---|---|---|
| 2006/0067416 A1* | 3/2006 | Tirkkonen et al. | 375/260 |
| 2007/0147543 A1* | 6/2007 | Horng et al. | 375/299 |
| 2008/0101441 A1* | 5/2008 | Palanki et al. | 375/146 |
| 2008/0192854 A1* | 8/2008 | Kim et al. | 375/267 |
| 2008/0247364 A1* | 10/2008 | Kim et al. | 370/336 |
| 2009/0052571 A1* | 2/2009 | Liu et al. | 375/267 |
| 2009/0124210 A1* | 5/2009 | Imai et al. | 455/69 |
| 2010/0054191 A1* | 3/2010 | Higuchi et al. | 370/329 |
| 2010/0273438 A1* | 10/2010 | Nishio et al. | 455/101 |
| 2011/0075651 A1* | 3/2011 | Jia et al. | 370/344 |
| 2011/0135016 A1* | 6/2011 | Ahn et al. | 375/259 |
| 2011/0135033 A1* | 6/2011 | Ko et al. | 375/295 |
| 2012/0188946 A1* | 7/2012 | Ma et al. | 370/328 |

FOREIGN PATENT DOCUMENTS

| | | |
|---|---|---|
| WO | WO 2005/122458 A1 | 12/2005 |
| WO | WO 2007/142233 A1 | 12/2007 |
| WO | WO 2008/081876 A1 | 7/2008 |
| WO | WO 2008/084777 A1 | 7/2008 |

OTHER PUBLICATIONS

K. Akita, et al. "Proposal of Weight Sequences for Tx Beam-Forming in E-UTRA Downlink", Toshiba Corporation, Sep. 2007, p. 328.

3GPP TSG RAN WG1 Meeting #42bis, R1-051046—Samsung, "Further Details on Adaptive Cyclic Delay Diversity Scheme" San Diego, USA, Oct. 10-14, 2005, pp. 1-9.

Chinese Office Action issued Apr. 3, 2013 for CN Application No. 200980128728.X.

R1-082609: Uplink Multiple Access for LTE-Advanced, Nokia, RAN WG1 Meeting #53bis, Warsaw, Poland, Jun. 20-Jul. 4, 2008, pp. 1-11.

Alcatel Shanghai Bell, Alcatel-Lucent, "UL Multiple Access with 4-Tx Antennas Transmit Diversity for Carrier Aggregation", R1-090059, 3GPP TSG RAN WG1 Meeting #55bis, Jan. 12-16, 2009, Ljubljana, Slovenia.

Huawei, "Initial comparison of UL TX diversity solutions for LTE-Advanced", R1-083707, 3GPP TSG RAN WG1#54bis, Sep. 29-Oct. 3, 2008, Prague, Czech Republic.

Mitsubishi Electric, "Comparison of uplink 4-Tx transmit diversity schemes for LTE-Advanced", R1-092728, 3GPP TSG RAN WG1 #57bis meeting, Jun. 29-Jul. 3, 2009, Los Angeles, USA.

Mitsubishi Electric, "Uplink transmit diversity schemes for LTE Advanced", R1-082522, 3GPP TSG RAN WG1 #53bis Meeting, Jun. 30-Jul. 4, 2008, Warsaw, Poland.

Nokia Siemens Networks, Nokia, "LTE-A Proposals for evolution", R1-081842, RAN WG1 #53, May 5-9, 2008, Kansas City, MO, USA.

NTT Docomo, "UL MIMO Transmission Schemes in LTE-Advanced", R1-083684, 3GPP TSG RAN WG1 Meeting #54bis, Sep. 29-Oct. 3, 2008, Prague, Czech Republic.

Toshiba Corporation, "Consideration on transmit diversity in E-UTRA uplink", TSG-RAN WG1 #46, Tallinn Estonia, Aug. 28-Sep. 1, 2006. R1-062192.

* cited by examiner

When cyclic delay amount is small (b)

When cyclic delay amount is large

WIRELESS COMMUNICATION SYSTEM, TRANSMITTER AND RECEIVER

TECHNICAL FIELD

The present invention relates to a wireless communication technique, and particularly to a communication technique for obtaining a frequency diversity effect by use of multiple transmission antennas.

BACKGROUND ART

In recent years, a high-speed and large-capacity data transmission has been demanded in a wireless communication system. Thus, research for increasing the use efficiency of a limited frequency band has been actively conducted. As a technique for achieving the purpose, high-speed communications using a multi-carrier transmission scheme such as an OFDM (Orthogonal Frequency Division Multiplex) scheme can be cited. However, use of such a multi-carrier transmission scheme has a problem of making PAPR (Peak to Average Power Ratio) high although achieving very high use of frequency.

This problem with the PAPR does not cause a large trouble in downlink where there is a margin in a transmission power amplification function, but causes an extremely large trouble in uplink where amplifiers have limitations. For this reason, use of a single carrier transmission scheme having a low PAPR is preferable for the uplink.

In this respect, for an LTE (Long Term Evolution) system which is the wireless communication system for the 3.9-generation mobile phones, a DFT-S-OFDM (Discrete Fourier Transform-Spread-OFDM (also, referred to as SC-FDMA)) scheme is employed as one of transmission schemes having a low PAPR in the uplink and being capable of generating a waveform by use of the same signal generation technique as that of the OFDM scheme. Like the OFDM scheme, the DFT-S-OFDM scheme enables frequency control in the following manner, although the DFT-OFDM scheme is a single carrier scheme. In the DFT-S-OFDM scheme, a modulation symbol sequence formed in blocks is transformed into a frequency signal by FFT (Fast Fourier Transform), and discrete spectrums are arranged on the basis of a specific arrangement rule to regenerate a time signal by IFFT (Inverse FFT: Inverse Fast Fourier Transform).

Further, for LTE-A (LTE-Advanced (also referred to as "IMT-A")) which is the fourth generation wireless communication system currently in progress for standardization, Clustered DFT-S-OFDM (also referred to as Clustered SC-FDMA or DSC (Dynamic Spectrum Control)) has been proposed as a technique to increase the frequency use efficiency while suppressing an increase in the PAPR (for example, Non-Patent Documents 1 and 2). Here, a cluster is a term for a group of multiple consecutive subcarriers. Specifically, the Clustered DFT-S-OFDM includes: dividing frequency components of a DFT-S-OFDM signal into some clusters; and then rearranging the frequency components. Use of this scheme enables the frequency band to be used flexibly in accordance with a propagation channel characteristic, although this scheme slightly deteriorates the PAPR property as compared with DFT-S-OFDM.

Figure 5:
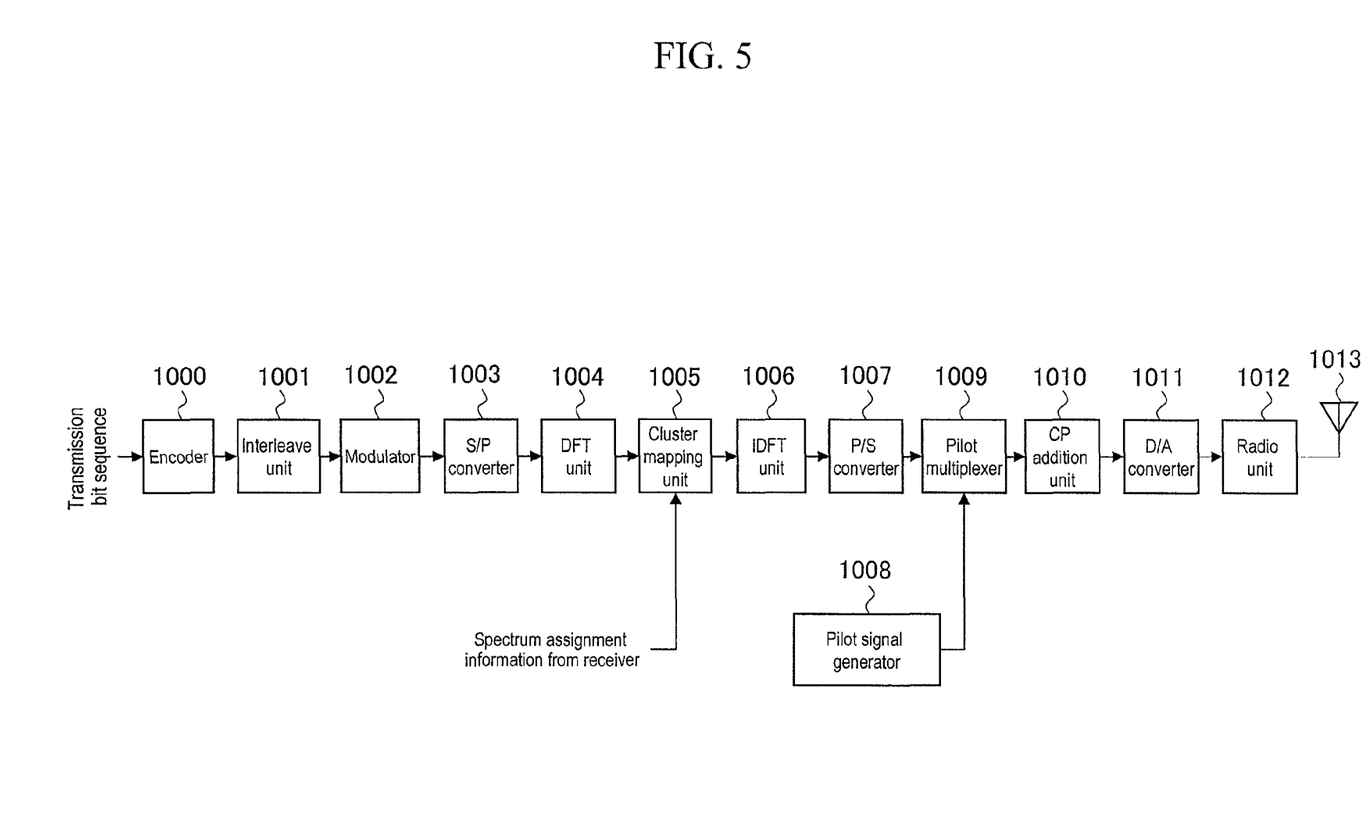
FIG. 5 is a diagram showing a configuration example of a transmitter employing a Clustered DFT-S-OFDM scheme.

FIG. 5 is a diagram showing a configuration example of a transmitter using the Clustered DFT-S-OFDM scheme. The transmitter shown in FIG. 6 includes the following units cited in the order from the input side of an inputted transmission bit sequence: an encoder 1000; an interleave unit 1001, a modulator 1002, a serial-to-parallel (S/P) converter 1003, a Discrete Fourier Transform (DFT) unit 1004, a cluster mapping unit 1005, an Inversed DFT (IDFT) unit 1006, a parallel-to-serial (P/S) converter 1007, a pilot signal generator 1008, a pilot multiplexer 1009, a cyclic prefix (CP) addition unit 1010, a digital-to-analog (D/A) converter 1011, a radio unit 1012 and a transmission antenna 1013.

Firstly, the encoder 1000 encodes a transmission bit sequence. The encoded data pieces are rearranged by the interleave unit 1001, and then modulated by the modulator 1002. The modulation signal is converted from serial data into parallel data by the S/P converter 1003, and then inputted to the DFT unit 1004. The inputted data is transformed into a signal on the frequency axis by the discrete Fourier transform. Thereafter, the cluster mapping unit 1005 divides the signal by determined cluster size, and maps each clustered signal to a subcarrier having an optimum frequency for the signal. Here, the transmitter is given, by a receiver, feedback information for specifying a mapping assignment in accordance with a receiving condition or the like, and performs the mapping on the basis of the information. The mapped symbol sequence is again transformed into a time axis signal by the IDFT unit 1006, and is further reconverted into serial data by the P/S converter 1007. Here, for the purpose of estimating a frequency characteristic of a propagation channel, a pilot signal is generated in parallel by the pilot signal generator 1008, and then the pilot signal and the aforementioned serial data are multiplexed by the pilot multiplexer 1009. A cyclic prefix (which may be considered as equivalent to a guard interval (GI)) is added to the multiplexed signal by the CP addition unit 1010. Then, after being converted into an analog signal in the D/A converter 1011, the signal is up-converted into a radio frequency to be used in the radio unit 1012. Then, the transmission antenna 1013 transmits the signal.

Figure 6:
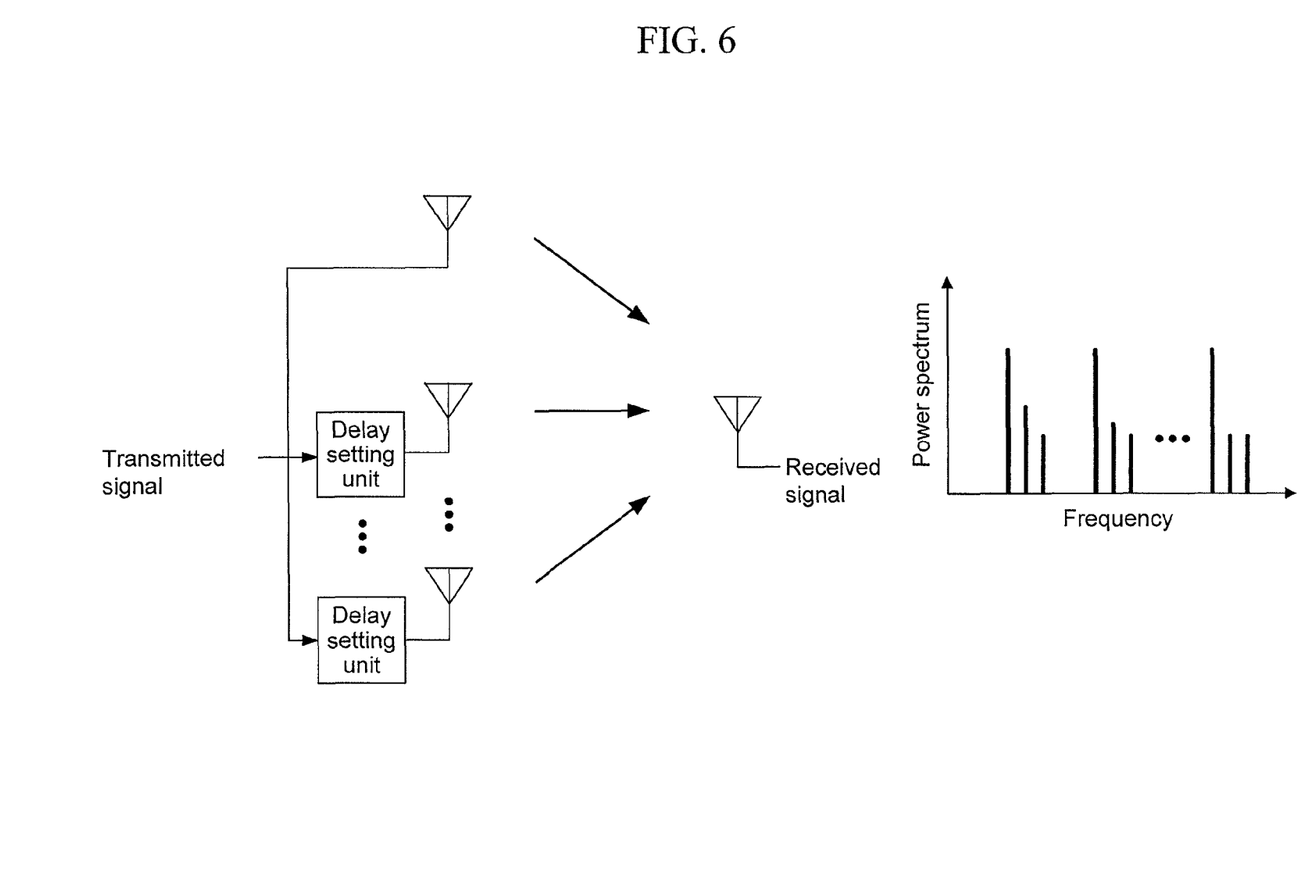
FIG. 6 is a diagram showing a concept of CDD.

Meanwhile, as a technique to improve an error rate of a received signal, a cyclic delay diversity (CDD) technique has been proposed on the assumption that the receiver can perform frequency domain equalization. In this technique, the top time positions of impulse responses are equivalently shifted by cyclically delaying signals from transmission antennas, and thereby the number of multipaths is intentionally increased to enhance the frequency selectivity of a propagation channel. In this way, this technique obtains a larger frequency diversity effect. FIG. 6 is a diagram showing the concept of the CDD. As shown in FIG. 6, the same signal is transmitted with different cyclic delays from multiple antennas. Accordingly, the number of incoming waves of the same signal increases in the receiver. As a result, the number of multipaths in the propagation channel is equivalently increased. Thus, the frequency diversity effect can be expected.

PRIOR ART DOCUMENTS

Non-Patent Documents

Non-Patent Document 1: NEC, REV-080022, "NEC's proposals for LTE Advanced"
Non-Patent Document 2: Nokia Siemens Networks, Nokia, R1-081842, "LTE-A Proposal for evolution"

SUMMARY OF THE INVENTION

Problem to be Solved by the Invention

Clustered DFT-S-OFDM (also referred to as Clustered SC-FDMA) is a technique to obtain a frequency selective diversity effect by dynamically assigning a cluster to a frequency of a good propagation channel state.

However, the effect cannot be efficiently obtained in a propagation channel of low frequency selectivity. As a transmission diversity technique used in such a propagation channel, STBC (Space-Time Block Coding) and SFBC (Space-Frequency Block Coding) can be cited. However, a problem with STBC is that, since STBC requires a decoding process to be performed with at least two Clustered DFT-S-OFDM symbols, it takes a while to complete the decoding process. Meanwhile, SFBC cannot achieve a low PAPR, which is a characteristic of the single carrier transmission. Thus, it is hard to say that SFBC is the optimum technique.

The present invention aims to efficiently obtain a frequency selective diversity effect in order to make the Clustered DFT-S-OFDM scheme obtain a good characteristic even in a propagation channel of low frequency selectivity Means for Solving the Problem An aspect of the present invention provides a transmitter including a plurality of antennas, the transmitter characterized by including: a DFT unit configured to transform a time domain signal into a frequency domain signal; a cluster mapping unit configured to divide the frequency domain signal into clusters and then to assign the clusters to frequencies on the basis of cluster assignment information; an IDFT unit configured to transform a mapped frequency domain signal into a time domain signal; and a cyclic delay setting unit configured to set, for each of the antennas, a cyclic delay amount to the IDFT-transformed time domain signal. As described above, a frequency selective diversity effect can be efficiently obtained by performing CDD in Clustered DFT-S-OFDM, for example. It is desirable that the transmitter should further include a cyclic delay amount determination unit configured to determine, on the basis of a predetermined cluster size, the cyclic delay amount to be set by the cyclic delay setting unit. With regard to a specific y criterion for setting the cyclic delay amount, it is desirable that the cyclic delay determination unit should determine a small cyclic delay amount when the cluster size is large, and determine a large cyclic delay amount when the cluster size is small. With regard to a more specific criterion for setting the cyclic delay amount, it is desirable that the cyclic delay determination unit should determine a cyclic delay amount inversely proportional to the cluster size.

In addition, the present invention may be carried out as a wireless communication system including: the above-described transmitter; and a receiver including a cluster assignment information generator configured to generate cluster assignment information of which the transmitter is notified. Note that the cluster assignment may be performed by the transmitter.

The cyclic delay amount determination unit may determine the cyclic delay amount on the basis of the cluster size and a temporal propagation channel fluctuation. For example, a larger amount of delay is set when the transmitter or receiver is moving fast. Specifically, in a case where it is determined, in the process of determining a propagation channel fluctuation, that the propagation channel fluctuation occurs drastically so that appropriate cluster assignment is difficult, the information indicating the determination result is transmitted to the cyclic delay amount determination unit in the transmitter. Then, a cyclic delay is set on the basis of the cyclic delay amount determined by the cyclic delay amount determination unit in the transmitter.

The present invention may be carried out as a wireless communication system including: the transmitter; and a receiver configured to notify the transmitter of information on the temporal propagation channel fluctuation. The information on the propagation channel fluctuation may be found by the transmitter.

As application of N×SC-FDMA, the present invention may be carried out a transmitter including multiple antennas, the transmitter characterized by including: an SC-FDMA signal generator configured to generate a SC-FDMA signal; a pre-coding unit configured to provide a cyclic delay to a frequency domain signal for each of the multiple antennas as a pre-coding process to be performed before IDFT; a mapping unit configured to assign data to a subcarrier number to be used; and an IDFT unit configured to transform a mapped frequency domain signal into a time domain signal. In a case where multiple DFT-S-OFDM signals are used, phase rotation corresponding to a cyclic delay is given as a pre-coding process before IDFT.

According to another aspect of the present invention, provided is a signal processing method for a transmitter including multiple antennas, the method characterized by including the steps of: transforming a time domain signal into a frequency domain signal; dividing the frequency domain signal into clusters and then assigning the clusters to frequencies on the basis of cluster assignment information notified from a receiver; and setting a cyclic delay amount for each of the multiple antennas.

The present invention may be carried out as a program for causing a computer to execute the method described above. Otherwise, the present invention may be carried out as a computer readable recording medium in which the program is stored. In addition, the program may be that which is obtained through a transfer medium such as the Internet.

Effect of the Invention

According to the present invention, a frequency selective diversity effect of Clustered DFT-S-OFDM for dynamically performing cluster assignment can be efficiently obtained by increasing frequency selectivity as a propagation channel characteristic by use of CDD. Thus, an error rate of signals is reduced, and the throughput is improved as a result.

DESCRIPTION OF SYMBOLS

00 . . . encoder, 01 . . . interleave unit, 02 . . . modulator, 03 . . . series-to-parallel (S/P) converter, 04 . . . Discrete Fourier Transform (DFT) unit, 05 . . . cluster mapping unit, 06 . . . Inversed Discrete Fourier Transform (IDFT: Inversed DFT) unit, 07 . . . parallel-to-serial (P/S) converter, 08 . . . pilot signal generator, 09 . . . pilot multiplexer, 10 . . . cyclic delay amount determination unit, 11-1 to 2 . . . cyclic delay setting unit, 12-1 to 2 . . . cyclic prefix (CP) addition unit, 13-1 to 2 . . . digital-to-analog (D/A) converter, 14-1 to 2 . . . radio unit, 15-1 to 2 . . . transmission antenna, 100 . . . receiver antenna, 101 . . . radio unit, 102 . . . A/D converter, 103 . . . CP remover, 104 . . . pilot separation unit, 105 . . . propagation channel characteristic and noise distribution estimation unit, 106 . . . propagation channel characteristic de-mapping unit, 107 . . . discrete frequency selection unit, 108 . . . cluster assignment information generator, 109 . . . S/P converter, 110 . . . DFT unit, 111 . . . cluster de-mapping unit, 112 . . . equalizer, 113 . . . IDFT unit, 114 . . . P/S converter, 115 . . . demodulator, 116 . . . de-interleave unit, 117 . . . decoder.

BEST MODES FOR CARRYING OUT THE INVENTION

Hereinafter, a communication technique according to each embodiment of the present invention will be described with reference to the drawings. In each embodiment to be described below, unless otherwise noted, a description will be given with an uplink communication, which is a communication from a mobile station to a base station in generally speaking. However, the communication to which the present invention is applied is not limited to the uplink communication, which is a communication from a mobile station to a base station.

First Embodiment

In a first embodiment of the present invention, a description will be given of a technique using a method for setting an appropriate CDD delay amount when a cluster size (the number of subcarriers to be included in a single cluster) is determined. Here, the description will be given of an example using two transmission antennas for the sake of simplicity of the description. In addition, the cluster size will be described on the assumption that an appropriate value of the cluster size is already determined between a transmitter and a receiver will be described.

Normally, the cluster size is determined on the basis of a difference between a characteristic of a power amplifier and a transmission power (referred to as a "power headroom" or the like in some cases) in a transmitter. The PAPR property becomes worse as the cluster size is set smaller. Conversely, the PAPR property becomes closer to a PAPR property of a single carrier scheme as the cluster size is set larger. Accordingly, the cluster size is controlled such that the cluster size is set smaller when the transmission power has some margin (when the transmission power has a margin in which the transmission power can be amplified) whereas the cluster is set larger when the transmission power has no margin. Thus, the influence of a reduction in the PAPR can be made as small as possible. This predetermined cluster size is referred to as a "CSIZE" in the description below.

Figure 2:
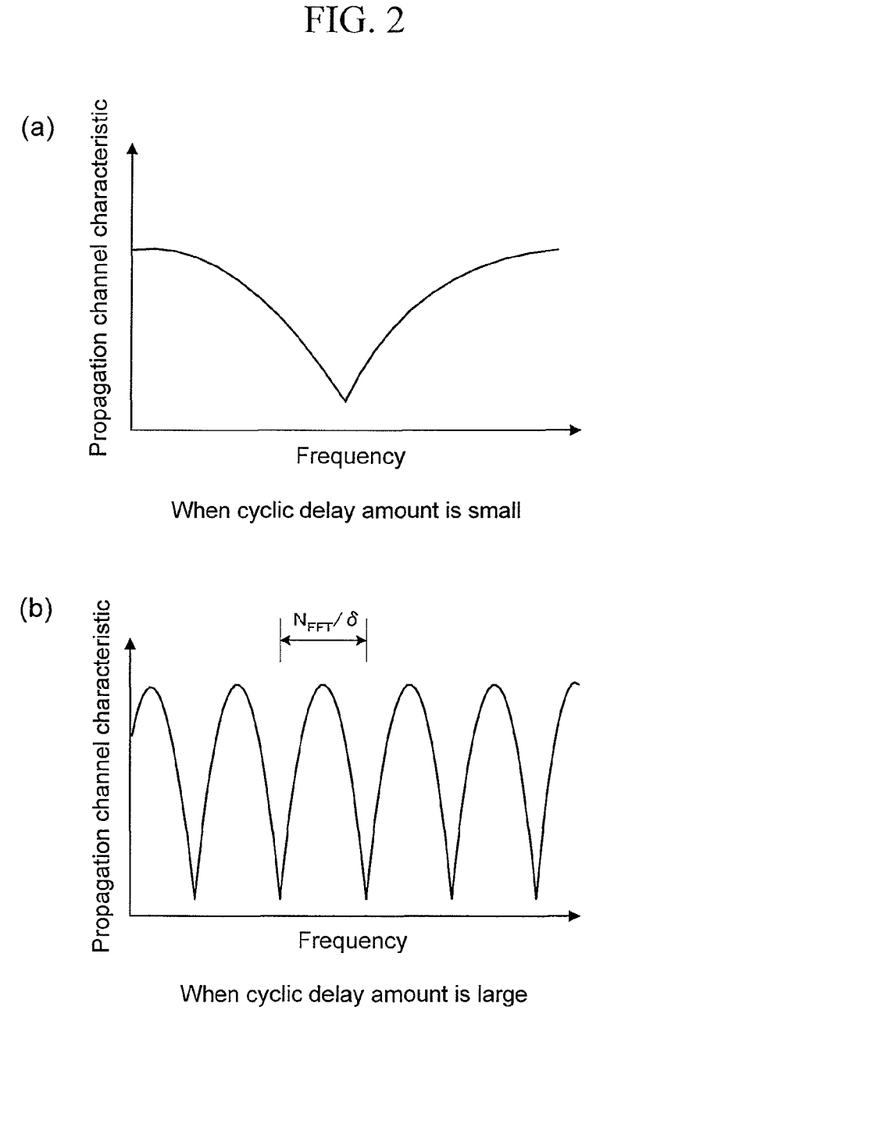
FIG. 2(a) shows an example of a case where a cyclic delay amount is small.
FIG. 2(b) shows an example of a case where a cyclic delay amount is large.

Here, an assumption is made that a transmitted signal from a first antenna is transmitted with no cyclic delay while a transmitted signal from a second antenna is transmitted with a constant amount of cyclic delay given for the signal. The signals transmitted from the two antennas are received after being spatially combined. Here, the top of the signal transmitted by the second antenna is observed as if the top of the signal were delayed in the propagation channel by the amount of the cyclic delay. Thus, the propagation channel characteristic for the transmitted signal viewed from the receiver has larger frequency selectivity in the case of the transmission from two antennas than in the case of the transmission from a single antenna. FIG. 2 are diagrams each showing an example of the propagation channel characteristic (frequency dependency of propagation channel characteristic) in the receiver at that time. FIG. 2(a) shows an example of a case where a cyclic delay amount is small, while FIG. 2(b) shows an example of a case where the cyclic delay amount is large. As shown in FIG. 2(b), it is learned that, as the delay amount is increased, the number of high peaks increases, and the number of drops in the characteristic also increases, as well as a continuous frequency band having a good characteristic around a single peak becomes narrower. If, with the aforementioned characteristics taken into consideration, the control is performed such that the cyclic delay amount is set small when the cluster size is large while the cyclic delay amount is set large when the cluster size is small, the propagation channel fluctuation can be reduced in the cluster, and a frequency diversity gain can be obtained as much as possible. Thus, the communication characteristic can be improved.

Next, the method for determining the delay amount will be specifically described. In a case where the number of transmission antennas is two, and a relative cyclic delay amount to be given in CDD is set δ, phase rotations φ and φ' for symbols in the frequency domains of the signals transmitted from the two antennas are given in accordance with Equation (1) given below, respectively.

[Equation 1]

$$\phi_i = 1 \tag{1}$$
$$\phi'_i = \exp\left(-j \cdot \frac{2\pi}{N_{FFT}} \cdot \delta \cdot i\right)$$

where i denotes the subcarrier number of the data symbol, and $N_{FFT}$ denotes the number of FFT points.

When the frequency response in a propagation channel between the transmission antennas and the reception antenna is flat, the cycle (repetition cycle of the characteristic peak and valley) of the frequency characteristic of the received signal expressed with $N_{FFT}/\delta$ as shown in FIG. 2(b). If the cluster size is set to be ½ of $N_{FFT}/\delta$, the subcarrier having a good propagation channel characteristic can be used (here, the objective is to use only a part having the good characteristic, so that the cluster size does not have to be necessarily set to ½ of it). Accordingly, an efficient diversity effect can be obtained if the cyclic delay is set as expressed with Equation (2) given below.

[Equation 2]

$$\delta = \frac{N_{FFT}}{2C_{SIZE}} \tag{2}$$

Actually, there is no such case where the frequency response is flat, but an appropriate delay amount of CDD can be set in accordance with the cluster size by using a value calculated on the basis of the equations shown here.

Next, a description will be given of a simple configuration example of each of a Clustered DFT-S-OFDM transmitter and a Clustered DFT-S-OFDM receiver for carrying out the present invention. FIG. 1(a) is a diagram showing a configuration example of a transmitter according to the embodiment. FIG. 1(b) is a diagram showing a configuration example of a receiver. Here, the description will be given on the assumption that an appropriate value of the cluster size is already determined between the transmitter and the receiver as noted earlier. In addition, a cluster assignment information generator (108) may be provided in the transmitter or the receiver, although the description will be given based on the assumption that: mapping to assign a cluster to an actual transmission frequency is determined by the receiver; and as feedback information, the mapping is transmitted to the transmitter.

As shown in FIG. 1(a), the transmitter includes the following components in the order from the input side of a transmission bit sequence: an encoder 00; an interleave unit 01; a modulator 02; a series-to-parallel (S/P) converter 03; a Discrete Fourier Transform (DFT) unit 04; a cluster mapping unit 05; an Inversed Discrete Fourier Transform (IDFT: Inversed DFT) unit 06; a parallel-to-serial (P/S) converter 07; a pilot signal generator 08; a pilot multiplexer 09; a cyclic delay amount determination unit 10; cyclic delay setting units 11-1 to 2; cyclic prefix (CP) addition units 12-1 to 2; digital-to-analog (D/A) converters 13-1 to 2; radio units 14-1 to 2; and transmission antennas 15-1 to 2.

The components up to the pilot multiplexer 09 perform the same processing as in the case of Clustered DFT-S-OFDM according to the aforementioned prior art example. Then, the signal multiplexed with the pilot signal by the pilot multiplexer 09 is duplicated in accordance with the number of transmission antennas to be used. Thus, two signals are formed herein. Then, the cyclic delay amount determined by the cyclic delay amount determination unit 10 in accordance with the cluster size is given to the signals by the cyclic delay setting units 11-1 and 2. In the CDD, however, no cyclic delay is usually given to one transmitted signal. For this reason, if a delay is given by the cyclic delay setting unit 11-2, no delay needs to be given by the cyclic delay setting unit 11-1, and this setting unit may be omitted. A rotation is given by the cyclic delay setting units 11-1 and 2 in accordance with the given delay amount. For example, when N pieces of data from X(0) to X(N−1) are inputted and the cyclic delay amount is set equal at $\delta n$ (which is an integer satisfying $\delta n > 0$), the cyclic delay unit outputs X(N−$\delta n$), X(N−$\delta n$+1), . . . , X(0), X(1), . . . , X($\delta n$−1) in this sequence. Because, as described, the cyclic delay is to simply change the time order of the pieces of data, the cyclic delay has no influence on the PAPR property of the transmitted signal observed in the time axis. In addition, the embodiment assumes a case where a cyclic delay is given to a pilot signal as well. Note that there may be a system in which no cyclic delay is given to a pilot signal. In this case, a propagation channel estimation taking a cyclic delay into consideration needs to be performed by the receiver. Cyclic prefixes are added to the two set signals by the cyclic prefix (CP) addition units 12-1 to 2, respectively. Subsequently, the signals are converted into analog signals by the D/A converters 13-1 to 2, respectively. Thereafter, the signals are up-converted into radio frequencies to be used by the radio units 14-1 to 2, and then transmitted from the transmission antennas 15-1 to 2, respectively.

FIG. 1(b) is a functional block diagram showing a configuration example of the receiver. In FIG. 1(b), the receiver includes: a reception antenna 100; a radio unit 101; an A/D converter 102; a CP remover 103; a pilot separation unit 104; a propagation channel characteristic and noise distribution estimation unit 105; a propagation channel characteristic de-mapping unit 106; a discrete frequency selection unit 107; a cluster assignment information generator 108; an S/P converter 109; a DFT unit 110; a cluster de-mapping unit 111; an equalizer 112; an IDFT unit 113; a P/S converter 114; a modulator 115; a de-interleave unit 116; and a decoder 117.

The reception antenna 101 receives a signal transmitted from the transmitter shown in FIG. 1(a). The received signal is down-converted by the radio unit 101, and is further converted into a digital signal from the analog signal by the A/D converter 102. Next, the cyclic prefix added to the signal is removed by the CP remover 103, and a pilot signal for checking the propagation channel characteristic is separated from the signal indicating the data by the pilot separation unit 104. From the separated pilot signal, the propagation channel characteristic and noise distribution estimation unit 105 estimates the frequency characteristic and the noise distribution of the propagation channel between the transmitter and the receiver. Then, the obtained information is subjected to de-mapping by the propagation channel characteristic de-mapping unit 106 for restoring the data signal, while a frequency appropriate for transmission (a frequency determined on the basis of the reception quality and the availability of the band) is selected on the basis of a reception condition of each discrete frequency by the discrete frequency selection unit 107 for cluster assignment in the transmitter. Then, what frequency should be used for each of the determined clusters is determined by the cluster assignment information generator 108. Then, as feedback information, the selected frequency is transmitted to the transmitter.

Meanwhile, the data signal from which the pilot signal is removed is converted from serial data into parallel data by the S/P converter 109. Then, the signal as the parallel data is transformed into a frequency axis signal through the DFT unit 110. Then, the data of each frequency is returned to the original position by the cluster de-mapping unit 111, and an equalization process is performed by the equalizer 112 in accordance with the propagation channel characteristic obtained through the pilot signal. Thereafter, the data is returned to the time axis signal through inversed discrete Fourier transform by the IDFT unit 113, and then is restored to the serial data through the P/S converter 114. The demodulator 115 demodulates the data into likelihood data per sign bit unit, and then rearranged in a bit sequence by the de-interleave unit 116. Thereafter, the transmitted data is eventually decoded by the decoder 117.

As described above, according to this embodiment, there is an advantage that a diversity gain can be more efficiently obtained without deterioration in the PAPR property by use of a transmission diversity technique using a cyclic delay appropriate for a cluster size.

Second Embodiment

Next, a communication technique according to a second embodiment of the present invention will be described with reference to the drawings. The communication technique according to this embodiment assumes a case where a temporal propagation channel fluctuation occurs drastically, such as a case where a terminal device moves fast. In this case, even if a propagation channel estimation is made by the receiver and then is fed back to the transmitter, the propagation channel characteristic is likely to change when the transmission using the information is performed. As a result, the cluster assignment performed with the propagation characteristic taken into consideration is not effective in this case.

In this respect, frequency diversity that is high on average no matter which band the assignment is performed on regardless of the propagation channel characteristic is preferred in a situation where a terminal device moves fast.

Figure 3:
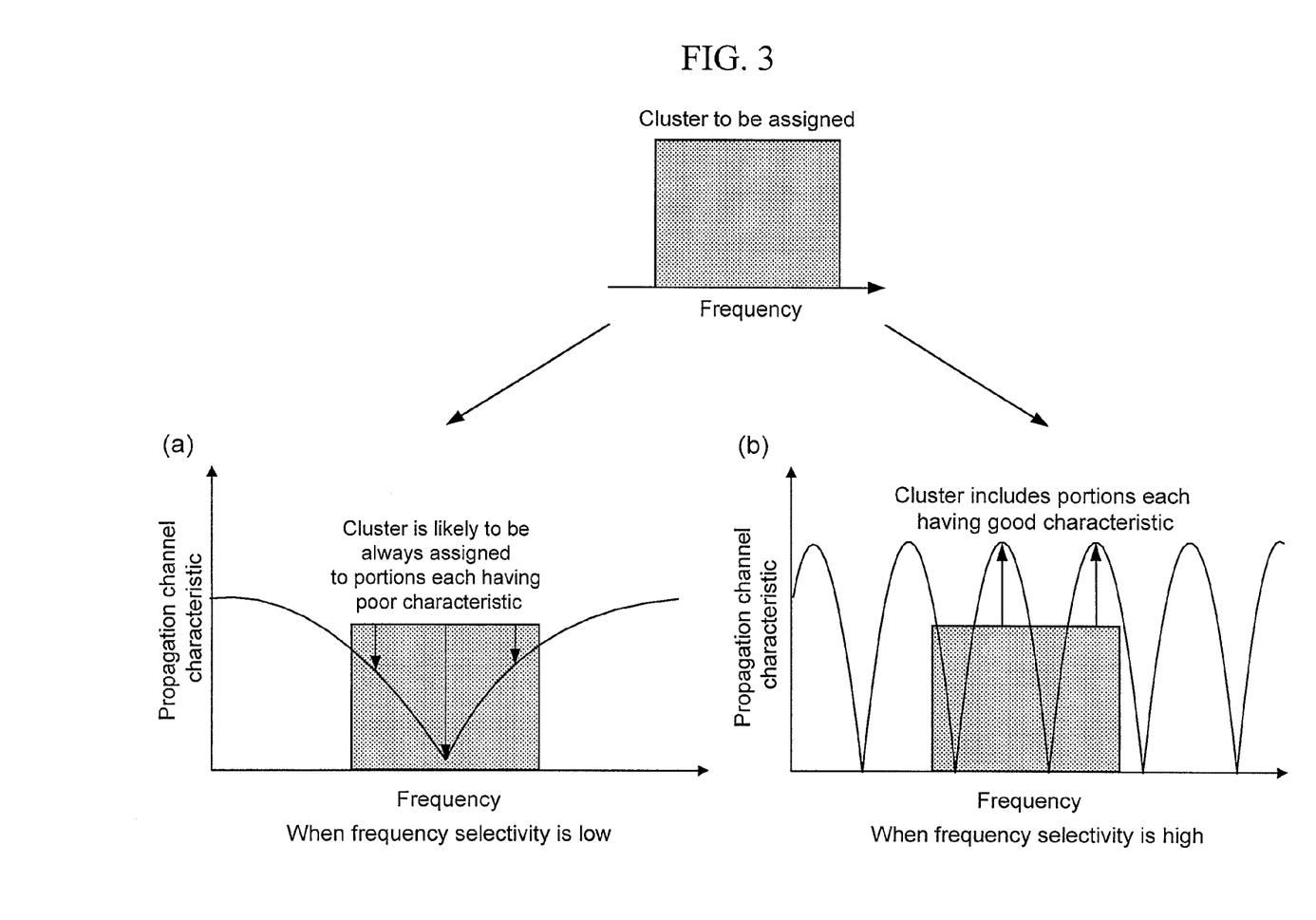
FIG. 3 is a diagram showing frequency dependency of a propagation channel characteristic which is observed in a case where assignment is performed without taking the propagation channel characteristic into account in a second embodiment of the present invention.

Here, with reference to FIG. 3, a description will be given of a case where assignment is performed without taking the propagation channel characteristic into consideration. As shown in FIG. 3(a), in a case where the frequency selectivity is low, an area where the propagation channel characteristic drops continuously exists within an assignable band. Thus, if a cluster is assigned to the area, the signal quality is degraded. Specifically, if a signal undergoes large flat fading, the frequency having a good characteristic becomes less likely to be assigned to the signal as the frequency selectivity becomes lower.

In contrast to this, when the cyclic delay amount in CDD is set at a large value to increase the frequency selectivity as shown in FIG. 3(b), the frequency having a good characteristic is likely to be always included in the assignment band regardless of the assignment position of the cluster. Thus, if a diversity effect is obtained from the signal in the band having a good characteristic, the error rate can be suppressed.

As described above, in a case where a temporal propagation channel fluctuation occurs drastically, at least one characteristic peak is included in a cluster by giving for the delay amount to the cyclic delay setting units in a way that a cycle of the frequency selectivity of the propagation channel characteristic is made shorter than the cluster size in Clustered DFT-S-OFDM. The cycle of the frequency selectivity is given by NFFT/δ as described in the first embodiment. Accordingly, if the cyclic delay amount δ is set in accordance with Equation (3) given below, the frequency diversity effect can be effectively obtained.

[Equation 3]

$$\delta \geq \frac{N_{FFT}}{C_{SIZE}} \quad (3)$$

Figure 1:
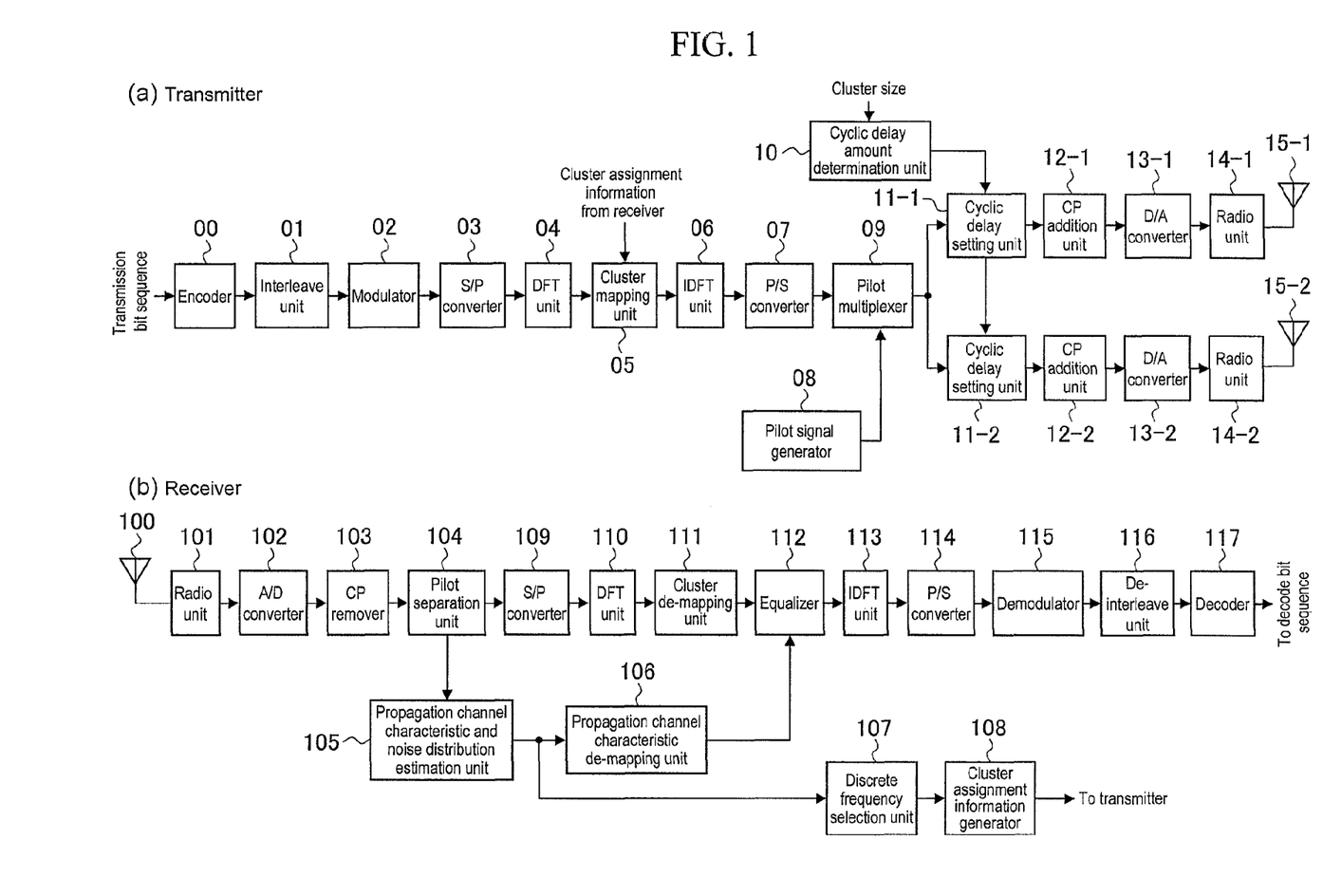
FIG. 1(a) is a diagram showing a configuration example of a transmitter according to the embodiment.
FIG. 1(b) is a diagram showing a configuration example of a receiver according to the embodiment.

The configurations of the transmitter and the receiver in this embodiment are almost the same as the configuration examples shown in FIG. 1 in the first embodiment, but the propagation channel characteristic and noise distribution estimation unit (105) of the receiver determines the size of a temporal propagation channel fluctuation. In a case where it is determined that the fluctuation is large and that cluster assignment to a frequency having a good propagation channel characteristic is thus difficult, information on the determination is transmitted to the cyclic delay amount determination unit (10) in the transmitter. Then, the cyclic delay is set on the basis of the cyclic delay amount given by Equation (3) given above. Note that the propagation channel fluctuation information may be uniquely measured in the transmitter.

Third Embodiment

The first and second embodiments are shown as the case where the number of transmission antennas is determined to be two. In this embodiment, however, an example in which N (>2) transmission antennas are used will be described. To begin with, consideration is given to a case where, as described in the first embodiment, a cyclic delay amount is set such that a cluster is assigned to only a frequency having a good characteristic with the cluster size matched with the cycle of the frequency selectivity of the propagation channel characteristic.

Frequency rotation $\phi_i^{(n)}$ given by the n-th (1<n≤N) antenna is represented by Equation (4) below.

[Equation 4]

$$\phi_i^{(n)} = \exp\left(-j \cdot \frac{2\pi}{N_{FFT}} \cdot \delta_n \cdot i\right) \quad (4)$$

$\delta_n$ is a value determined for each antenna. A condition required for δn is that the fluctuation cycle of the frequency response of the propagation channel expected to occur in the receiver is at least twice the cluster size (the value is set to be twice the cluster size in the first embodiment). Accordingly, in a case where there are three or more antennas, the cyclic delay amount of each of the antennas (excluding an antenna(s) for which a cyclic delay is not set) is required to satisfy Equation (5) given below.

[Equation 5]

$$\delta_n \leq \frac{N_{FFT}}{2C_{SIZE}} \quad (5)$$

Further, when the maximum integer included in a number δn that satisfies Equation (5) is denoted by δm, the other numbers δn are set such that the cyclic delay amounts set to the other antennas become integers close to δm×a/(N−1) (where "a" is a natural number satisfying 1≤a≤N−2). This setting enables the cyclic delay amounts to be set evenly, thus making it possible to effectively obtain a diversity effect.

Next, when there are three or more antennas in the case of the second embodiment, a setting that satisfies Equation (6) given below may be used.

[Equation 6]

$$\delta \geq \frac{N_{FFT}}{2C_{SIZE}} \quad (6)$$

Moreover, when the minimum integer included in a number δn that satisfies Equation (6) is denoted by δj, the other numbers δn are set such that the cyclic delay amounts set to the other antennas become equal to δj×(a+1) (where "a" is a natural number satisfying 1≤a≤N−2). This setting enables the cyclic delay amounts to be set evenly, thus making it possible to effectively obtain a diversity effect.

Fourth Embodiment

In the aforementioned first to third embodiments, the Clustered DFT-S-OFDM scheme is described. In the fourth embodiment of the present invention, a description will be given of a case where multiple DFT-S-OFDM signals each employing a normal signal carrier format are used. For the sake of simplicity of the description, the description will be given of a case where two DFT-S-OFDM signals are simultaneously transmitted. Incidentally, even when the number of DFT-S-OFDM signals is three or more, the embodiment can deal with the signals.

Figure 4:
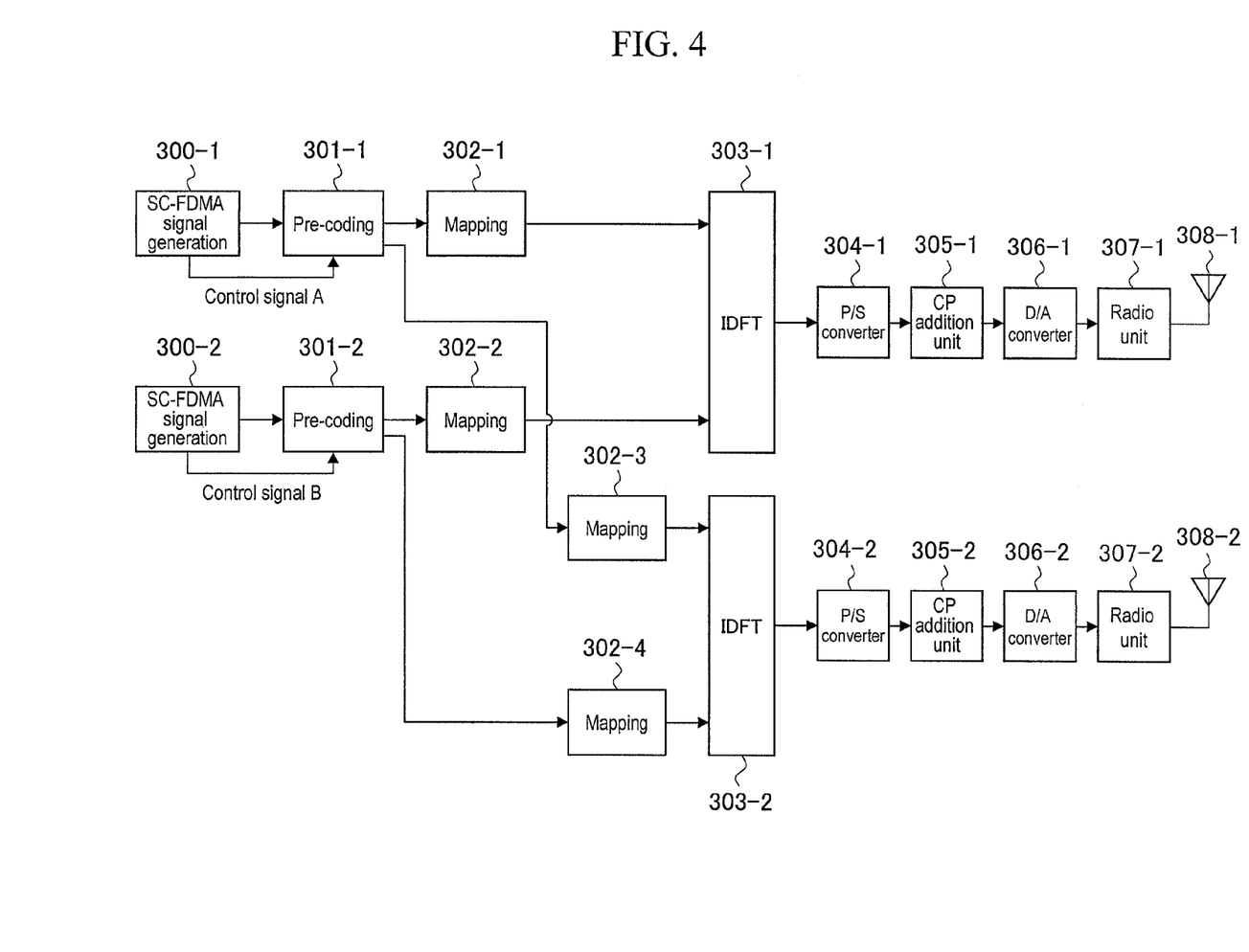
FIG. 4 is a simplified functional block diagram for describing a communication device according to a fourth embodiment of the present invention.

FIG. 4 is a simplified functional block diagram for describing a communication device according to the embodiment. In FIG. 4, reference numerals 300-1 to 2 respectively denote functional blocks each for generating a DFT-S-OFDM signal, each of which includes the functions denoted by reference numerals 1000 to 1004 shown in FIG. 5. Functional blocks 301-1 to 2 are each a pre-coding unit for giving a cyclic delay to the signal. In the first and second embodiments, the cyclic delay is given after the time domain, i.e., IDFT. In this embodiment, however, the cyclic delay is given as a precoding process performed before IDFT. When application to the first embodiment is considered, this process is to assign a frequency rotation based on the cyclic delay amount to each subcarrier on the basis of Equations (7), (8) given below.

[Equation 7]

$$\phi_i = 1 \quad (7)$$

$$\phi_i' = \exp\left(-j \cdot \frac{2\pi}{N_{FFT}} \cdot \delta \cdot i\right)$$

$$\delta = \frac{N_{FFT}}{2C_{SIZE}} \quad (8)$$

Here, i represents the subcarrier number, which is an input number in the IDFT unit. In addition, $\phi_i$ represents a phase rotation amount for the signal connected to an antenna 308-1, while $\phi_i'$ represents a phase rotation amount for the signal connected to an antenna 308-2.

A characteristic point of this embodiment is that the DFT-S-OFDM signals of the functional blocks 300-1 and 300-2 are not always in the same band. In this respect, when the bands for the respective signals (the number of subcarriers to be used) are set to be S1 and S2, the rotation amounts of the frequency domains given by the pre-coding units 300-1, 300-2 coincide with values wherein S1 and S2 are assumed to be the cluster sizes in the first to third embodiments. In other words, $C_{SIZE}$=S1 or S2.

Accordingly, the signal to be inputted into the pre-coding unit 301-1 is the number S1 of subcarriers of the signal generated by the DFT-S-OFDM signal generator 1, and the signal to be inputted into the pre-coding unit 302-1 is the number S2 of subcarriers of the signal generated in the DFT-S-OFDM signal generator 2.

In order to perform pre-coding corresponding to different cyclic delays, a phase rotation corresponding to each of the cyclic delays as shown in this embodiment needs to be given in the frequency domain.

In each of the mapping units 302-1, 302-2, data is assigned to the subcarrier number to be used. Incidentally, "0" is normally inputted into a subcarrier not to be used.

The functional blocks between IDFT units 303-1 to 2 and transmission antenna 308-1 to 2 have the same functions as the functional blocks between the IDFT 1006 and the transmission antenna 1013 (except for the pilot multiplexers shown in FIG. 5).

As described above, in this embodiment, appropriate pre-coding can be performed for signals each having multiple bandwidths by giving a cyclic delay in a frequency domain.

Note that this embodiment has been described as the example in which the processing is performed on the DFT-S-OFDM signals having different bands, but it is obvious that the embodiment can be applied to multiple Clustered DFT-S-OFDM signals having different cluster sizes.

Fifth Embodiment

The aforementioned first to fourth embodiments aim to obtain a high transmission diversity effect by: changing the cyclic delay amount of CDD to virtually change the frequency selectivity of the propagation channel; and thus setting a propagation channel characteristic optimum for the assignment. However, in a case where the reception environment is poor, e.g., the influence of noise is large in the receiver, the averaging (filtering or the like) in a frequency direction is performed as a noise compensation technique in the propagation channel estimation in some cases. In a case where the frequency selectivity is increased beyond a certain level by CDD in the aforementioned situation, the given frequency selectivity is determined to be noise by the filtering in the propagation channel estimation. As a result, the given frequency selectivity leads to reduction in the accuracy of the propagation channel estimation, and thus results in failure to obtain a desired transmission diversity effect.

In this respect, in this embodiment, when a signal is transmitted to a receiver using the averaging in the frequency direction as the noise compensation in the propagation channel estimation, the signal is transmitted with a small cyclic delay amount or without any cyclic delay amount. In addition, when a signal is transmitted to a receiver capable of sufficiently maintaining the accuracy of the propagation channel estimation by use of another technique, a large cyclic delay amount or a cyclic delay amount as specified in the first to fourth embodiments is given.

Figure 7:
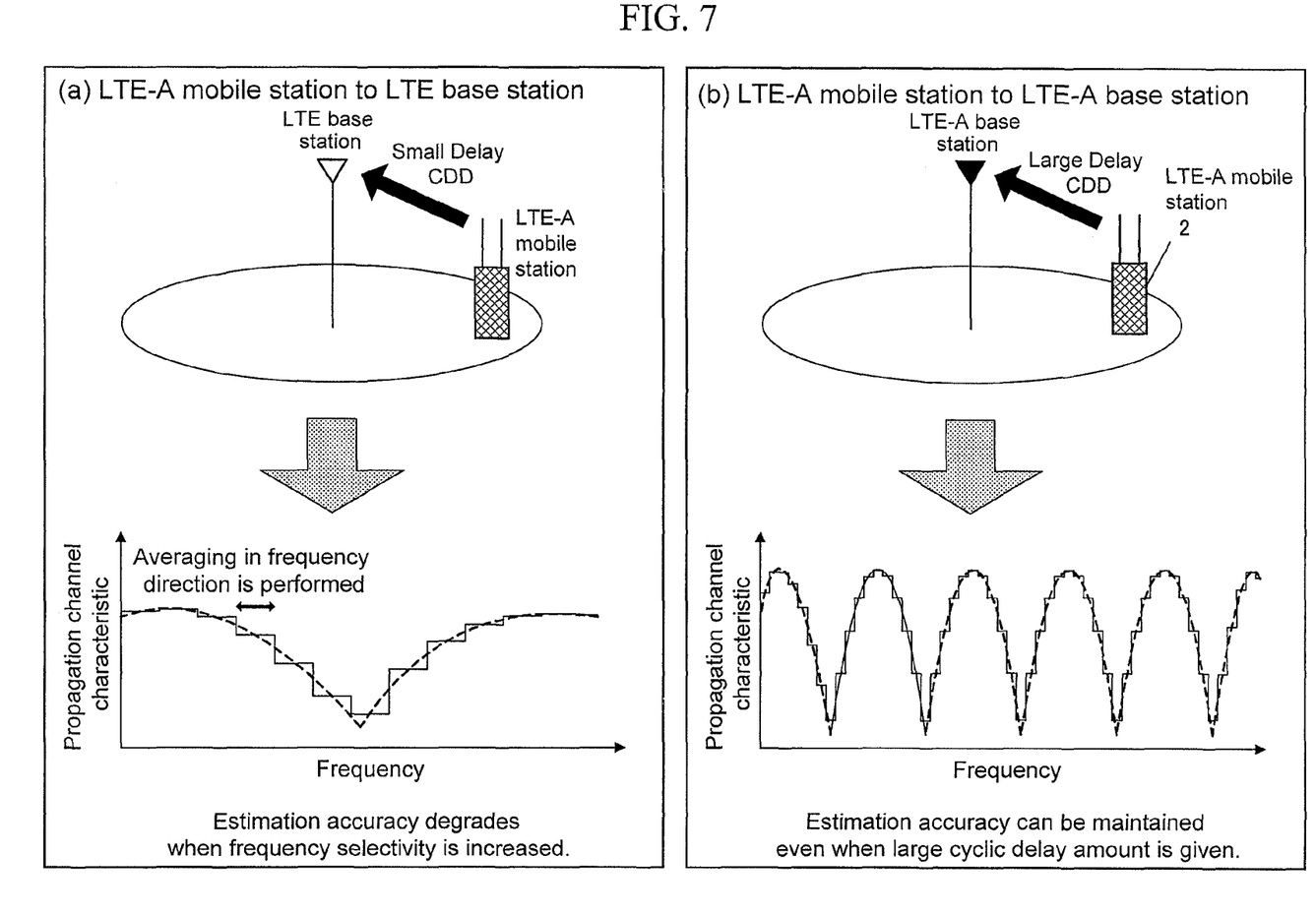
FIG. 7 is a principle diagram for describing a communication device according to a fifth embodiment of the present invention.

Here, as an example of such a receiver supposed to use the averaging in the frequency direction, an LTE base station not supporting transmission diversity can be cited. In such an LTE base station, the propagation channel estimation does not expect a propagation channel environment having large frequency selectivity that can be obtained when a large cyclic delay amount is given in CDD. Accordingly, it is considered that, as shown in FIG. 7(a), a propagation channel estimation method performed for a propagation channel having relatively low frequency selectivity, such as the averaging in the frequency direction is used. Thus, when the frequency selectivity is excessively large, the accuracy of the propagation channel estimation is likely to be degraded. However, because an uplink mobile station which employs LTE-A having backward compatibility with LTE can have multiple transmission antennas, it is possible to use transmission diversity. In addition, since CDD requires no special operation in the receiver, a case where an LTE base station receives a transmitted signal on which CDD is performed in a mobile station corresponding to LTE-A is considered. In this case, the giving of a large cyclic delay amount by CDD may lead to deterioration in the transmission characteristic. For this reason, when CDD is performed in a mobile station meeting a standard which supports transmission diversity, such as LTE-A, a small cyclic delay amount including "0" is given to the LET base station with consideration given to degradation in the accuracy of the propagation channel estimation.

Meanwhile, since the propagation channel estimation having resistance against large frequency selectivity fading is performed on a base station supporting transmission diversity, such as an LTE-A base station as shown in FIG. 7(b), an optimum cyclic delay amount is adaptively given. Accordingly, transmission diversity can be efficiently obtained in accordance with the propagation channel estimation method of the receiver.

Moreover, the transmission diversity used in the embodiment is described in relation to CDD alone. However, in a case where a transmitter and some receivers support multiple transmission diversity schemes including CDD, SFBC, STBC and the like, the transmitter may use CDD with a small cyclic delay amount for a receiver(s) not supporting any transmission diversity scheme, and may use a different transmission diversity scheme for a receiver(s) supporting the transmission diversity scheme. Such an application method is also employable.

INDUSTRIAL APPLICABILITY

The present invention is applicable to a communication device.

The invention claimed is:

1. A transmitter including a plurality of antennas, the transmitter characterized by comprising:
   a Discrete Fourier Transform (DFT) unit configured to transform a time domain signal into a frequency domain signal:
   a cluster mapping unit configured to divide the frequency domain signal into clusters and to assign each of the clusters to consecutive frequencies on the basis of cluster assignment information:
   an Inverse Discrete Fourier Transform (IDFT) unit configured to transform a mapped frequency domain signal into a time domain signal:
   a cyclic delay setting unit configured to set, for each of the antennas, a cyclic delay amount of the IDFT-transformed time domain signal: and
   a cyclic delay amount determination unit configured to determine, on the basis of a cluster size, which is the number of subcarriers to be included in a single cluster, the cyclic delay amount to be set by the cyclic delay setting unit.

2. The transmitter according to claim 1 characterized in that the cyclic delay determination unit determines a small cyclic delay amount when the cluster size is large, and determines a large cyclic delay amount when the cluster size is small.

3. The transmitter according to claim 1, characterized in that the cyclic delay determination unit determines a cyclic delay amount inversely proportional to the cluster size.

4. The transmitter according to claim 1, characterized in that the cyclic delay amount determination unit determines tile cyclic delay amount on the basis of the cluster size and an amount of variation per time of a propagation channel.

5. A wireless communication system comprising:
   the transmitter according to claim 4; and
   a receiver configured to notify the transmitter of information on the propagation channel.

6. A signal processing method for a transmitter including a plurality of antennas, the method characterized by comprising the steps of:
   transforming a time domain signal into a frequency domain signal;
   dividing the frequency domain signal into clusters and assigning the clusters to frequencies on the basis of cluster assignment information notified from a receiver,
   setting a cyclic delay amount for each of the plurality of antennas; and
   determining, on the basis of a cluster size, which is the number of subcarriers to be included in a single cluster, the cyclic delay amount to be set.

7. A non-transitory computer-readable medium storing a program which when executed by a computer performs a signal processing method for a transmitter including a plurality of antennas, the method comprising the steps of:
   transforming a time domain signal into a frequency domain signal;
   dividing the frequency domain signal into clusters and assigning the clusters to frequencies on the basis of cluster assignment information notified from a receiver,
   setting a cyclic delay amount for each of the plurality of antennas; and
   determining, on the basis of a cluster size, which is the number of subcarriers to be included in a single cluster, the cyclic delay amount to be set.

8. The transmitter according to claim 1, characterized in that the cyclic delay amount determination unit determines a given cyclic delay amount of 0 or greater for a receiver using averaging with adjacent subcarriers to estimate a propagation channel, and determines a cyclic delay amount for other types of receivers on the basis of the cluster size.

* * * * *